United States Patent Office 3,015,017
Patented Dec. 26, 1961

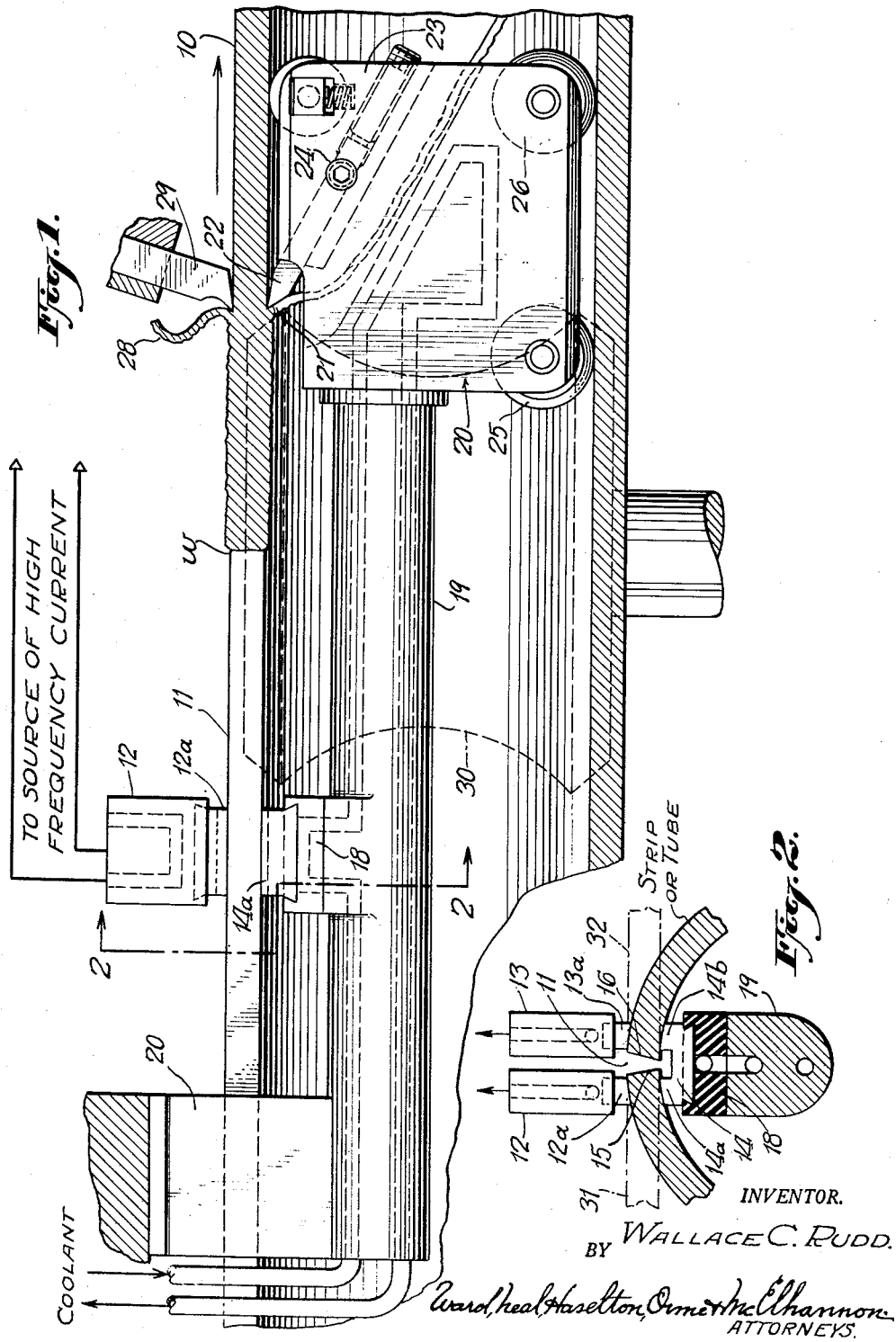

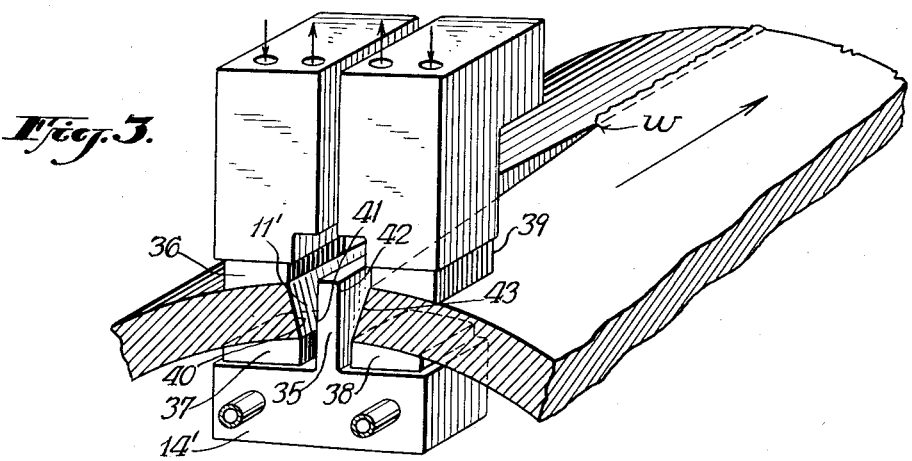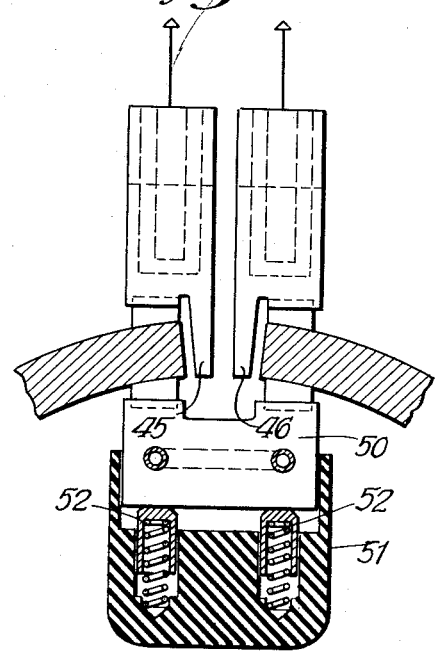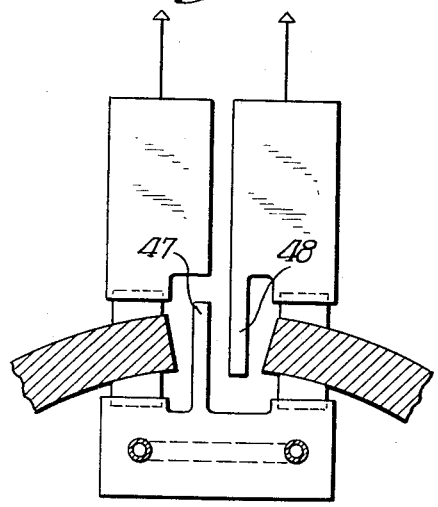

3,015,017
METHOD AND APPARATUS FOR WELDING THICK-WALLED TUBING AND OTHER METAL PORTIONS
Wallace C. Rudd, Larchmont, N.Y., assignor to Magnetic Heating Corp., New Rochelle, N.Y., a corporation of New York
Filed Feb. 24, 1961, Ser. No. 91,502
9 Claims. (Cl. 219—65)

This invention relates to methods and apparatus for welding together opposed edges of metal portions in cases such as where the edges are relatively thick. The invention is adapted for the welding together of metal portions such as strips, bars or structural shapes and is also particularly well adapted for welding metal portions which comprise opposed edges of a longitudinal gap in metal tubing.

In United States Patent No. 2,818,488, granted December 31, 1957, to Wallace C. Rudd and Robert J. Stanton, there is disclosed and claimed methods and apparatus for welding together opposed edges of metal along a V-shaped gap, for example in continuously advancing metal tubing, the heating of the edges to welding temperature in advance of the welding point being accomplished by connecting the terminals of a high frequency current source to contacts engaging respectively opposite sides of the gap, so that the current flows from said contacts to and from the welding point along the approaching gap edges, the current being closely concentrated on the edge surfaces by reason of the highly effective mutual inductance between such edges. While this method has proven to be highly satisfactory and has gone into extensive use, yet in some instances where the metal edges are relatively thick, some difficulties have occurred in that the lowest impedance path for the current flowing from the contacts to and from the welding point, will tend to be along the upper portions of the edges, so that the heating effect will be less concentrated along on the lower edge portions. Also, in cases where for any reason it is necessary in practice to space the contacts at any very substantial distance from the welding point, it will be difficult satisfactorily to use the method for welding metal portions or tube portions of finite lengths since, because of such spacing, the front ends as well as the trailing ends of such members of finite length upon entering and leaving the apparatus, cannot be properly heated. Furthermore, in cases where such method is used for welding tubing and in which magnetic means are mounted within the tubing to impede the flow of the current in paths circumferentially around the back side of the tubing, difficulties may be encountered if the tube walls are quite thick, in providing adequate clearance within the limited space available within the tubing for positioning and mounting such magnetic means and means for scarfing away the metal upset along the interior of the line of the weld.

The present invention provides a reliable and efficient form of apparatus and method for avoiding the above-noted difficulties in the welding together of relatively thick metal edge portions. In accordance with the present invention, the terminals of a high frequency source of current may be connected to contacts which are applied to the metal portions respectively, for example on the upper surfaces of the metal adjacent opposite sides of the gap. And also contact means are applied, for example, to engage the lower surfaces of the metal portions adjacent opposite sides of the gap and so as effectively to short circuit the lower portions of the opposite sides of the gap. With this arrangement, the high frequency current, or at least the greater part thereof, will be caused to flow transversely across on the surfaces of the gap edges, the current at any moment flowing in opposite directions respectively across on said edges so that, by reason of mutual inductance, the current will be closely concentrated on the very edge surfaces for heating such surfaces to welding temperature without softening the metal of the edges to any substantial depth and thereby affording the possibility of a good forged weld at the point where the edges are brought together under pressure, viz., at the welding point. The contact means may be so placed in this manner, quite close to the welding point, so that the edge surfaces, after being thus heated by current flowing transversely thereover, will not have opportunity to cool below welding temperature upon reaching the weld point. Also, if the contact arrangement is positioned fairly close to the welding point, then a part of the current may flow from the main contacts where it is applied to the metal portions, to and from the weld point, as in the case of the prior known method above referred to. In fact, the contact arrangement may be so positioned in advance of the weld point that the current flowing transversely across the edges will be supplemented by enough of the current flowing along on the edges to and from the weld point so that the temperature of the edges will not be permitted to fall during the short interval between the points of application of the transversely flowing current and the weld point.

Various further and more specific objects, features and advantages of the invention will appear from the description given below, taken in connection with the accompanying drawings, illustrating by way of example preferred forms of the invention.

In the drawings:

FIG. 1 is a vertical sectional view illustrating one of the preferred embodiments of the invention as applied to the welding of a longitudinally extending gap in metal tubing;

FIG. 2 is a transverse sectional view, partly broken away, taken substantially along line 2—2 of FIG. 1 and also indicating by dotted lines the application of the invention to the welding of two metal portions which may not necessarily be portions of a length of tubing;

FIG. 3 is a perspective view showing an alternative embodiment of the invention; and FIGS. 4 and 5 are transverse sectional views somewhat similar to that of FIG. 2, but showing further alternative embodiments of the invention.

Referring in further detail to FIG. 1, a length of tubing is indicated at 10, the same being longitudinally advanced in the direction of the arrow, as indicated, past a weld point $w$ which is located approximately at the vertex of a longitudinally extending V-shaped gap, as indicated at 11. As indicated in FIGS. 1 and 2, the terminals of a source of high frequency current respectively are connected to contacts or electrodes as at 12, 13, which preferably have high temperature and wear resistant replaceable shoe portions as at 12a and 13a for engaging the upper surfaces of the metal on opposite sides of the gap 11 and adjacent thereto. A further electrode member or contact 14 is mounted beneath the gap and also preferably has wear-resistant, temperature-resistant shoe portions as at 14a and 14b, which engage the under-surfaces respectively of the metal at opposite sides of the gap and so as thereby in effect to short-circuit the lower portions of the gap edges. Thus a path for the high frequency current is provided from one terminal of the source to contact shoe 12a, thence down across on the edge surface 15 of the gap (that is, in a direction to extend transversely of the gap and transversely of said edge) and thence to the contact shoe 14a, then over to contact shoe 14b and transversely up across on the edge surface 16 of the gap to the contact shoe 13a and back to the other terminal of the source of current. At any particular moment, it will be apparent that the current will flow in opposite directions respectively across on the surfaces of the gap edges. That is, with the apparatus oriented in the particular way shown in the drawings, the current at any one moment will flow down on gap edge surface 15 and up across gap edge surface 16 and in view of the opposed polarities of the current, the mutual inductance effect therebetween will serve with a high degree of effectiveness for causing the current to be concentrated on the very edge surfaces, particularly if the current is of a suitable frequency such as 50,000 cycles per second or preferably higher, for example in the range of 350,000 to 450,000 cycles per second. Since the contact piece 14 in effect short-circuits the lower portions of the gap edges, there will be substantially no tendency for portions of the current to be wasted by flowing in paths extending circumferentially around the back or underside of the tubing. Also, since the contact piece 14 with its shoe portions 14a and 14b are located quite close to the shoe portions 12a and 13a respectively, by far the lowest impedance path for the current between shoe portions 12a and 13a will be by way of the paths transverse to the gap edges and to and from the contact piece 14. Thus only a relatively small amount of the current will tend to flow along on the gap edges from the contact shoe portions 12a and 13a to and from the welding point w. However, by locating the contact arrangement fairly close to the weld point, a predetermined proportion of the current may be caused to flow from the contact shoes 12a, 13a to and from the welding point and thus flowing along the gap edges and retaining same against loss of temperature before they reach the welding point, or even if desired, further increasing the temperature of the edges. Also, if the contact piece 14 is so made or shaped or positioned as to have some substantial degree of impedance to the high frequency being used, then at least some substantial portion of the current may be caused to flow on the under or lower portions of the gap edges to and from the welding point. In any case, by properly shaping and positioning the contact arrangement or by adjusting its spacing from the welding point, one may be assured of properly heating the edges throughout their depth to the desired welding temperature.

All of the contact pieces and the supports therefor should preferably be provided with conduits or passages for circulating a fluid coolant therethrough, these passages being partly indicated by dotted lines on the contact parts and supports.

The contact piece 14, as shown, may be mounted on an insulating supporting piece 18, which in turn is suitably fixed to a mandrel or the like 19 having its rear end carried on a suitable supporting means as at 20 extending down through the gap in the tubing or between the two metal portions to be welded. If desired, the forward end of the mandrel 19 may be utilized to carry a suitable arrangement as indicated generally at 20 for scarfing away the metal upset as at 21 along the interior of the line of the weld. This arrangement may, for example, comprise a scarfing tool 22 suitably adjustably mounted on a carriage 23 as by means indicated at 24 to extend upwardly and rearwardly into engagement with the upset metal. Such carriage means may be supported as by rollers 25, 26 which may be held down against the lower interior surface of the tubing as by an upwardly directed spring-pressed roller, as indicated at 27. The metal which has been upset, as at 28, on the upper side or exterior of the line of the weld, may be scarfed away as by a scarfing tool such as indicated at 29.

As in the case of the method of the above-identified prior patent, it will be understood that the metal portions may be pressed together to close the gap approximately at the weld point as by the use of opposed pressure rollers, one of which is indicated by dotted lines at 30. In the event the metal portions which are to be welded together comprise strips or the like, same may be advanced by similar means through the apparatus and the manner in which same are engaged by the contact arrangement will be apparent from FIG. 2, wherein two such strip portions are indicated by dotted lines respectively at 31 and 32.

With the somewhat different embodiment of the invention shown in FIG. 3, a contact piece 14' is shown corresponding to contact 14 in FIG. 2, except that in FIG. 3 this contact piece is formed with an upstanding portion 35 extending up into the gap 11' in spaced relation to the edges thereof. This provides a means for further insuring effective concentration of the current on the very edge surfaces of the gap by reason of mutual inductance and the so-called proximity effect. Here contact shoes are provided at 36, 37, 38 and 39 corresponding to those indicated respectively at 12a, 14a, 14b and 13a in FIG. 2. Thus the high frequency current path will extend for example from one terminal of the source over shoe 36 down transversely across gap edge surface 40 to contact shoe 37, thence up along on the surface 41 of the protrusion or extension 35, that is, on the surface thereof closest to surface 40, thence over and down across surface 42 of such protrusion, viz. the surface closest to the edge surface 43 of the gap and to contact shoe 38, thence up across surface 43 to contact 39 back to the other terminal of the current source. The use of a formation such as at 35 on the contact piece 14' may be desirable in cases where the contact arrangement is located at a region at which the gap edges have to be relatively widely spaced and where it is still highly desirable to concentrate the heating current as closely as possible on the very edge surfaces of the gap. Alternatively and for similar reasons, the contacts may be formed with portions protruding into the gap in the manner shown in either FIG. 4 or FIG. 5. That is, in FIG. 4, the two upper contacts respectively have portions 45 and 46 which protrude down into the gap and in FIG. 5, the lower contact piece has a protrusion 47 extending up into the gap whereas one of the upper contacts has a protrusion 48 extending down into the gap. With both these embodiments, the paths of current flow on the protrusions and on the gap edges will be downwardly or upwardly on the surfaces thereof (in directions transverse to the length of the gap between the edges to be welded) and the current flow will be downwardly or upwardly as the case may be, in opposite directions on the surfaces of the protrusions or gap edges which are the most closely spaced so that by reason of the so-called proximity effect, the current will be closely concentrated on the surfaces of the metal as desired.

As shown in the embodiment of FIG. 4, the lower contact piece 50 may for example be so mounted as to be received in an insulation piece 51 provided with spring assemblies as at 52 for yieldably urging the shoes on contact piece 50 respectively up against the metal portions to be welded at opposite sides of the gap. Similar spring means if desired may be provided in all of the other embodiments.

The various embodiments of the invention are particularly well adapted for use in cases where the thickness of the metal being welded is from one-quarter inch up to three-quarters of an inch or possibly greater. In such cases the invention makes possible a highly uniform degree of heating to the desired predetermined welding temperature of the entire surface portions of the thick edges. This uniformity of heating arises from the fact that the same current must flow down across on one edge and then upwardly across on the opposed edge surface. Also, since all portions of both edge surfaces are moving longitudinally past the contact arrangement along fixed paths respectively and preferably at a uniform speed, it will be apparent that the heating effect from point to point along on the edges will necessarily be uniform.

It will be understood that the terms "upper" and "lower" or "undersurface" as used in the appended claims are used to distinguish between the upper and lower surfaces of the metal portions when the apparatus is oriented or positioned as shown on the drawings but that, of course, the apparatus, if desired, could be inverted or placed at various angular positions and it is intended that the claims nevertheless be applicable thereto.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding together opposed edges of two metal portions which edges are relatively thick, such method comprising advancing such portions with a V-shaped gap between said edges while applying pressure from opposite sides of the portions to bring said edges together at a welding point approximately at the vertex of the gap and while heating the opposed edge surfaces to welding temperature in advance of said point by conductively applying thereto high frequency current flowing along on a path which extends from one terminal of the current source transversely across on the surface of one of said edges, then over to the other edge and transversely across on the surface of such other edge to the other terminal of the current source, the current at any moment flowing in opposite directions respectively across on said edges.

2. Method in accordance with the foregoing claim 1 and in which a relatively small proportion of high frequency current from the source is caused to flow from points on the metal portions respectively at opposite sides of the gap to and from the weld point in directions longitudinally of the approaching gap edges.

3. Method for welding together opposed edges of a longitudinal gap in relatively thick walled metal tubing, such method comprising longitudinally advancing such tubing while applying pressure from opposite sides thereof to bring said edges together at a welding point and while heating the edge surfaces to welding temperature in advance of said point by conductively applying thereto high frequency current flowing along on a path which extends from one terminal of the current source transversely across on the surface of one of said edges to the interior surface of the tubing adjacent said edge, thence in the tubing over to the other edge and transversely across on the surface of such other edge to the exterior of the tubing and to the other terminal of the current source, the current at any moment flowing in opposite directions respectively across on said edges.

4. A method for welding together the edges defining a gap in metal tubing, such method comprising advancing the tubing longitudinally while applying pressure thereto to close the said gap at a welding point, and heating said gap edges to welding temperature at said welding point, characterized in that the heating of the gap edges is effected by the application of a high frequency electrical current to said tubing by means of contacts which engage the tube metal at points on the outside of the tube respectively at or near the opposite gap edges and at positions shortly in advance of said welding point, other contact means also being provided to engage and interconnect points at or adjacent the gap edges on the interior surface of the tubing, said current being of a frequency of the order of 50,000 cycles per second or higher whereby the lowest impedance path for the current between said first-named contacts extends transversely across on one of said edge surfaces to said other contact means and from the latter transversely across the other of said edges to the other of said first-named contacts.

5. Apparatus for welding together the edges defining a gap in metal tubing, such apparatus comprising means for longitudinally advancing the tubing past means for applying pressure thereto to close said gap at a welding point, and means for heating said gap edges to welding temperature at the welding point, characterized by electrodes mounted to contact said tubing respectively at points on the outer surface thereof at or adjacent the opposite gap edges and at a position shortly in advance of the welding point, other electrode means also being provided within the tubing adjacent said position for engaging and interconnecting points respectively on the inner surface of the tubing at or adjacent the gap edges whereby a current path is provided from one of said first-mentioned electrodes transversely across on one of said edges to said other electrode means and thence transversely across on the other edge to the other of said first-mentioned electrodes.

6. Apparatus in accordance with the foregoing claim 5 and in which means are provided for mounting said other electrode means with spring pressure engagement with the interior surfaces of the tubing.

7. Apparatus in accordance with the foregoing claim 5 and in which at least one of the electrodes or electrode means is provided with a conductive portion extending therefrom into the gap in spaced relation to said edges whereby at least a part of the current will flow over the surface of said extending portion and by reason of the proximity effect increase the degree of concentration of the current on the surfaces of said edges.

8. Apparatus for welding together opposed edges of two metal portions of substantial thickness, such apparatus comprising means for longitudinally advancing said portions with the edges spaced apart by a longitudinally extending V-shaped gap, means for applying pressure from opposite sides of the portions to bring said edges together under pressure at a welding point approximately at the vertex of such gap, a source of electrical current of a frequency of 50,000 cycles per second or higher, contacts respectively connected to the terminals of said source and mounted to contact with said metal portions respectively at points on the upper surfaces thereof at or adjacent the opposed gap edges and at a position shortly in advance of the welding point, other contact means also being provided adjacent said position but mounted to engage and interconnect points respectively on the undersurfaces of said metal portions at or adjacent the gap edges, whereby a current path is provided from one of said first-mentioned contacts transversely across on one of said edges to said other contact means and thence transversely across on the other of said edges to the other of said first-mentioned contacts.

9. Apparatus in accordance with the foregoing claim 8 and in which at least one or more of the contacts is provided with a conductive portion extending therefrom into the gap in spaced relation to the gap edges whereby at least a part of the current will flow over the surface of said extending portion or portions and by reason of the proximity effect increase the degree of concentration of the current on the surfaces of said edges.

No references cited.